(12) United States Patent
Xu et al.

(10) Patent No.: US 12,319,140 B2
(45) Date of Patent: Jun. 3, 2025

(54) VEHICLE OPERATING APPARATUS, VEHICLE SYSTEM AND VEHICLE BRAKING SYSTEM

(71) Applicant: Volvo Car Corporation, Gothenburg (SE)

(72) Inventors: Yinbing Xu, Shanghai (CN); Hua Fan, Shanghai (CN); Wentao Xu, Shanghai (CN); Bin Xu, Shanghai (CN); Li Zhang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/510,779

(22) Filed: Nov. 16, 2023

(65) Prior Publication Data

US 2024/0166045 A1    May 23, 2024

(30) Foreign Application Priority Data

Nov. 21, 2022 (CN) .......................... 202211453206.0

(51) Int. Cl.
*B60K 26/02* (2006.01)
*B60T 7/06* (2006.01)

(52) U.S. Cl.
CPC .............. *B60K 26/021* (2013.01); *B60T 7/06* (2013.01); *B60K 2026/026* (2013.01)

(58) Field of Classification Search
CPC ............................................. B60K 2026/026
See application file for complete search history.

(56) References Cited

U.S. PATENT DOCUMENTS

| 10,906,514 B1* | 2/2021 | Kim ........................ G05G 5/03 |
| 2020/0257329 A1* | 8/2020 | Kihara ..................... G05G 5/06 |
| 2021/0149432 A1 | 5/2021 | Neubauer |
| 2021/0394798 A1* | 12/2021 | Kim ........................ B60T 7/042 |
| 2022/0055477 A1* | 2/2022 | Kim ........................ G05G 5/03 |

FOREIGN PATENT DOCUMENTS

CN    107697042 B   * 11/2020   .............. B60T 11/18

OTHER PUBLICATIONS

Apr. 19, 2024 European Search Report issued in corresponding EP Application No. 23211073.4.

* cited by examiner

*Primary Examiner* — Vicky A Johnson
(74) *Attorney, Agent, or Firm* — Clements Bernard Walker; Christopher L. Bernard

(57) ABSTRACT

A vehicle operating apparatus including a stressed means configured to receive a force applied thereon by a driver for operating a vehicle; a connecting means configured such that a first end is mechanically connected to the stressed means and a second end is mechanically connected to a mounting surface of the vehicle; a sensor configured to sense information associated with the force applied by the driver and convert the information into an electrical signal, the vehicle is able to perform driving-related operations in response to the signal; and an actuating means configured to actuate the connecting means according to a current driving state of the vehicle so that the stressed means is maintained at a specific position.

16 Claims, 8 Drawing Sheets

VEHICLE OPERATING APPARATUS, VEHICLE SYSTEM AND VEHICLE BRAKING SYSTEM

CROSS-REFERENCE TO RELATED APPLICATION

The present disclosure claims the benefit of priority of co-pending Chinese Patent Application No. 202211453206.0, filed on Nov. 21, 2022, and entitled "VEHICLE OPERATING APPARATUS, VEHICLE SYSTEM AND VEHICLE BRAKING SYSTEM," the contents of which are incorporated in full by reference herein.

TECHNICAL FIELD

The present disclosure relates to the field of vehicles. More specifically, the present disclosure relates to a vehicle operating apparatus, a vehicle system and a vehicle braking system.

BACKGROUND

The vehicle operating apparatus is used to perform various operations on the driving of a vehicle, for example including accelerating operation, decelerating operation and braking operation. Therefore, the vehicle operating apparatus is an important component of the vehicle, and its performance directly determines the safety and maneuverability of the vehicle during driving.

However, a traditional vehicle operating apparatus is constrained by the structure of the gasoline car itself and is required to meet factors such as existing safety standards, which leads to the structure-related configuration, such as the mounting position of the brake pedal or the connection method for the accelerator pedal, is often constrained, and in turn leads to problems such as a waste of vehicle's space and poor driving maneuverability. On the other hand, with the continuous development of new energy automobile technology and the rapid popularization of electro-cars, the demand for designing braking systems for new-type vehicles and their corresponding standards is also increasing with each passing day.

In view of the above, there is a need for an improved vehicle operating apparatus to solve at least the above-mentioned problems in the prior art, and to be suitable for new safety standards and new-type vehicles.

SUMMARY

According to one aspect of the present disclosure, there is provided a vehicle operating apparatus comprising: a stressed means configured to receive a force applied thereon by a driver for operating a vehicle; a connecting means configured such that a first end is mechanically connected to the stressed member and a second end is mechanically connected to a mounting surface of the vehicle; a sensor configured to sense information associated with the force applied by the driver and convert the information into an electrical signal, and the vehicle is able to perform a corresponding driving operation in response to the electrical signal; and an actuating means configured to actuate the connecting means according to a current driving state of the vehicle so that the stressed means is maintained at a specific position.

According to an embodiment of the present disclosure, wherein the actuating means actuating the connecting means according to the current driving state of the vehicle so that the stressed means is maintained at a specific position, comprising: actuating the connecting means in response to the vehicle being in a first state, so that a main body portion of the vehicle operating apparatus is maintained outside an accommodation space; and actuating the connecting means in response to the vehicle being in a second state, so that the main body portion of the vehicle operating apparatus is maintained inside the accommodation space; wherein the accommodation space is located below the mounting surface.

According to an embodiment of the present disclosure, wherein the first state includes the vehicle being in a manual driving mode, the vehicle being in a semi-automatic driving mode, the vehicle being in a starting state, and the driving speed of the vehicle being within a first range; and the second state includes the vehicle being in an automatic driving mode, the vehicle being in a flameout or stop state, and the driving speed of the vehicle being within a second range different from the first range.

According to an embodiment of the present disclosure, wherein the accommodation space further includes a cover plate configured to be opened before or when the connecting means is actuated, so that the main body portion of the vehicle operating apparatus passes through the accommodation space, and to remain closed at other times.

According to an embodiment of the present disclosure, wherein during the main body portion of the vehicle operating apparatus being maintained in the accommodation space, the connecting means is actuated in response to an activation indication input by the driver, so that the main body portion of the vehicle operating apparatus moves to be outside the accommodation space.

According to an embodiment of the present disclosure, wherein the second end of the connecting means is mounted in a non-firewall area of the vehicle.

According to an embodiment of the present disclosure, wherein the connecting means further includes a feedback means configured to generate a reactive force due to the force applied by the driver on the stressed means, and a direction of the reactive force is in a same line with a direction in which the stressed means moves under the force applied by the driver.

According to an embodiment of the present disclosure, wherein the vehicle operating apparatus includes at least one of a brake apparatus and an accelerating apparatus, wherein the brake apparatus performs a braking operation on the vehicle in response to the electrical signal; and the accelerating apparatus performs an accelerating operation on the vehicle in response to the electrical signal.

According to another aspect of the present disclosure, there is also provided a vehicle system, comprising: the vehicle operating apparatus described in the above embodiments; and a vehicle control system configured to control the vehicle operating apparatus according to the current driving state of the vehicle.

According to an embodiment of the present disclosure, wherein the vehicle control system includes a bus via which vehicle information related to vehicle driving is transmitted; a controller module coupled with the bus and configured to determine the current driving state of the vehicle according to the vehicle information, and control the actuating means of the vehicle operating apparatus to actuate the connecting means according to the current driving state of the vehicle, so that the stressed means is maintained at a specific position.

According to an embodiment of the present disclosure, wherein the controller module includes a master controller and a slave controller, wherein the master controller and the slave controller are configured to receive the vehicle information synchronously via the bus; the master controller is further configured to determine the current driving state of the vehicle based on the vehicle information, control the vehicle operating apparatus according to the current driving state of the vehicle, and periodically send first state information indicating its own state and operation information related to controlling the vehicle operating apparatus to the slave controller; and the slave controller is further configured to determine a state of the master controller according to the first state information, take over control, when the state of the master controller is determined to be abnormality, of the vehicle operating apparatus of the vehicle based on the received operation information in the next working cycle, and provide a warning to the vehicle, wherein the warning further includes diagnostic information related to the abnormality.

According to an embodiment of the present disclosure, wherein the slave controller is further configured to periodically send second state information indicating its own state to the master controller; and the master controller is further configured to determine a state of the slave controller according to the second state information, and provide a warning to the vehicle when the state of the slave controller is determined to be abnormality, wherein the warning further includes diagnostic information related to the abnormality.

According to yet another aspect of the present disclosure, there is also provided a vehicle braking system, comprising: a brake apparatus for braking a vehicle; a controller for determining a current driving state of the vehicle, and controlling a main body portion of the brake apparatus to be maintained outside an accommodation space in response to the vehicle being in a first state, and controlling the main body portion of the brake apparatus to be maintained inside an accommodation space in response to the vehicle being in a second state, wherein the accommodation space is located below a mounting surface of the vehicle.

According to yet another aspect of the present disclosure, there is provided a vehicle operating apparatus comprising: a pedal panel in which one or more pedal components are embedded, wherein the pedal component comprises: a pedal pad configured to protrude on a surface of the pedal panel and receive a force applied thereon by a driver; an elastic element arranged below the pedal pad and configured to be deformed under the force applied by the driver; and a force sensor configured to generate an electrical signal according to an amount of deformation of the elastic element, and the vehicle is able to perform a corresponding driving operation in response to the electrical signal.

According to an embodiment of the present disclosure, wherein the pedal member further comprises: a pedal backboard arranged between the pedal pad and the elastic element and configured to move and provide pressure to the elastic element under the force applied by the driver, and the pedal backboard and the elastic element are hidden beneath the surface of the pedal panel.

According to an embodiment of the present disclosure, wherein the one or more pedal members include at least one of a brake pedal and an accelerator pedal, and a first elastic element in the brake pedal has a first elastic coefficient, and a second elastic element in the accelerator pedal has a second elastic coefficient, and the first elastic coefficient is greater than the second elastic coefficient According to an embodiment of the present disclosure, wherein the pedal panel is actuated to perform a movement according to a current driving state of the vehicle, and the movement includes translational movement, pivotal movement, or a combination thereof.

In the operating apparatus for vehicle according to the present disclosure, the mounting position of the operating apparatus can be configured in flexible ways, so that the space of the vehicle is improved, and the improved operating apparatus has better maneuverability while ensuring safety.

BRIEF DESCRIPTION OF THE DRAWINGS

These and/or other aspects and advantages of the present disclosure will become clearer and easier to be understood from the following detailed description of embodiments of the present disclosure, taken in conjunction with the accompanying drawings, in which.

Figure 1:
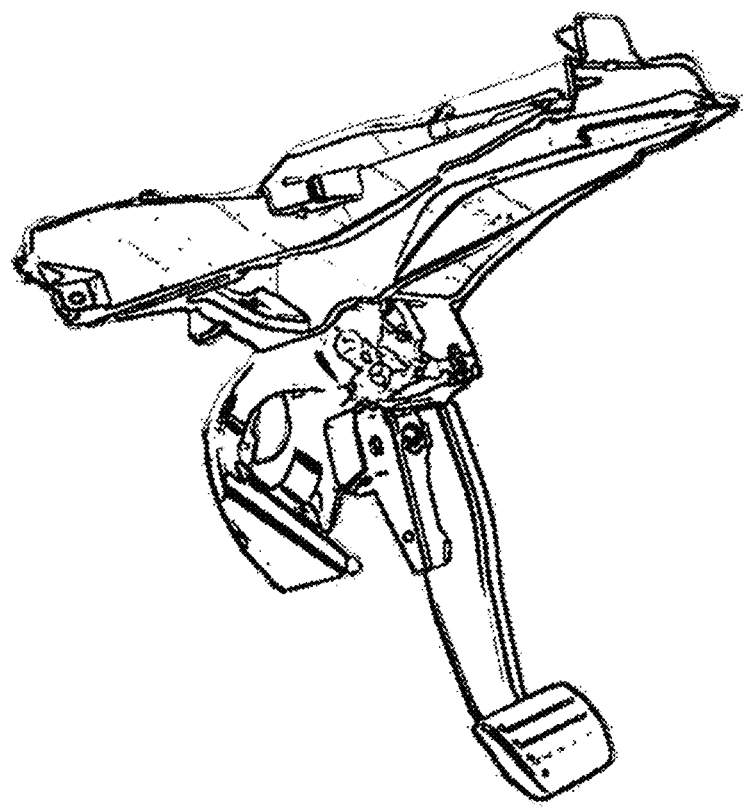
FIG. 1 illustrates a schematic diagram of a conventional brake apparatus.

It should be understood that these accompanying drawings are used to provide a further understanding of the embodiments of the present disclosure and constitute a part of the specification, and together with the embodiments of the present disclosure, serve to explain the present disclosure, and do not constitute a limitation to the present disclosure. Furthermore, in the accompanying drawings, like reference numerals generally represent like parts or steps.

DETAILED DESCRIPTION

In order to better set forth the technical solution of the present disclosure, the present disclosure will be further illustrated in conjunction with the accompanying drawings and the detailed description. It should be understood that based on the embodiments described in the present disclosure, all other embodiments obtained by those skilled in the art without creative labor should fall within the protection scope of the present disclosure, and the embodiments described herein are only part of the embodiments of the present disclosure, not all the embodiments of the present disclosure. These embodiments are only illustrative and exemplary, and thus should not be interpreted as limiting the scope of the present disclosure.

First of all, in the embodiments described in the present disclosure, a vehicle operating apparatus refers to a apparatus for operating the driving of the vehicle, that is, the driver can realize driving actions, such as accelerating, decelerating or braking, on the vehicle through the vehicle operating apparatus. Typically, according to the embodiment of the present disclosure, the operating apparatus may be a brake apparatus (or broadly referred to as a brake) or an accelerating apparatus (or broadly referred to as an accelerator), wherein the brake apparatus performs a braking (or decelerating) operation on the vehicle in response to an instruction issued by the driver; and the accelerating apparatus performs an accelerating operation on the vehicle in response to an instruction issued by the driver. In addition, in some embodiments, the operating apparatus may also integrate the functions of both the brake apparatus and the accelerating apparatus as separate entities to operate the driving of the vehicle.

Firstly, the basic principles of traditional braking system and acceleration system are briefly described.

Taking the most common hydraulic braking system in gasoline cars as an example, such braking system usually includes an enclosed brake fluid loop, which is filled with brake fluid. The brake fluid will move in the loop if being under pressure, and can transfer the pressure onto the piston of the brake caliper of the corresponding wheel through the loop because the volume of the brake fluid is basically not compressed after being stressed. Then the brake caliper is actuated by the piston to clamp the brake disc, so as to generate a friction force to brake the vehicle. Additionally, the acceleration system in gasoline cars usually transfers the driver's pedaling force to the engine through members such as pull rods, rocker arms, pulleys and the like, so as to adjust the throttle opening of the engine to control the air intake. When the throttle opening increases, the air flow entering the air inlet will increase, so that the combustion heat of combustible mixture will also increase, resulting in an increase in the work done by the gas on the piston, and as a result, the engine's rotating speed will increase, that is, the vehicle accelerates due to an increase in power. On the contrary, when the throttle opening decreases, the engine's rotating speed will decrease, that is, the vehicle decelerates due to a decrease in power. It can be seen that the traditional operating apparatus utilizes the transmission of force to operate the driving of the vehicle. The present disclosure will propose an improved operating apparatus different from the traditional operating apparatus.

Hereinafter, for the purpose of illustration rather than limitation, the present disclosure will mainly set forth the technical concept of the present disclosure by taking a brake apparatus (braking system) as an example of a vehicle operating apparatus.

FIG. 1 illustrates a schematic diagram of a traditional braking system. As described above, in such braking system, because the friction force to brake the vehicle is generated by the transmission of force, it is necessary to make a rigid mechanical connection between the brake pedal and components at the rear end. As shown in FIG. 1, the brake pedal is required to be mounted on the firewall of the vehicle in the form of a suspended lever brake pedal, so as to amplify the torque applied by the driver's stepping. However, this mounting method may cause the brake apparatus and its connecting means to occupy the driver's cabin space, it may also cause the driver to touch the brake pedal by mistake during driving, and this may pose a safety hazard. Similarly, for other vehicle operating apparatuses, such as the acceleration system, the above problems also exist.

In view of this, the present disclosure proposes an improved electronic vehicle operating apparatus, which adopts a completely different operating principle from the traditional force transmission method, and the mounting position of the improved operating apparatus may be not constrained by the firewall area of the vehicle, and the parts of the operating apparatus can be located in different positions according to the driving state of the vehicle, thereby not only expanding the driver's cabin space but also achieving safety.

Next, the basic idea of the electronic brake apparatus proposed in the present disclosure is briefly summarized. In order to make the specification more clear and concise, detailed descriptions of functions and structures well known in the art will be omitted below, and repetitive explanations and illustrations of steps and elements will also be omitted.

The present disclosure proposes an electronic operating apparatus for vehicle, which is different from the braking principle of the hydraulic braking system in the above-mentioned traditional vehicles. Taking a brake apparatus as an example, such electronic brake apparatus generally converts the force applied by the driver for braking operation into an electrical signal, and causes the vehicle to perform a braking operation in response to the electrical signal without transmission by the force of the brake fluid. Similarly, in response to the electrical signal corresponding to the driver's accelerating operation, the vehicle may be caused to perform an accelerating operation without transmitting the driver's pedaling force to the throttle of the engine. Therefore, such electronic operating apparatus does not need a rigid mechanical connection between the pedal and the transmission mechanism at the rear end, which improves the control efficiency and fault tolerance of the system. On the other hand, by replacing hydraulic or pneumatic transmission with electrical signal control, the vehicle can spare the necessity for the loop system and suspended mounting for the transmission medium, simplify the structure of the vehicle system and save the cabin space, and make the mounting and maintenance of the brake apparatus more convenient.

Figure 2:
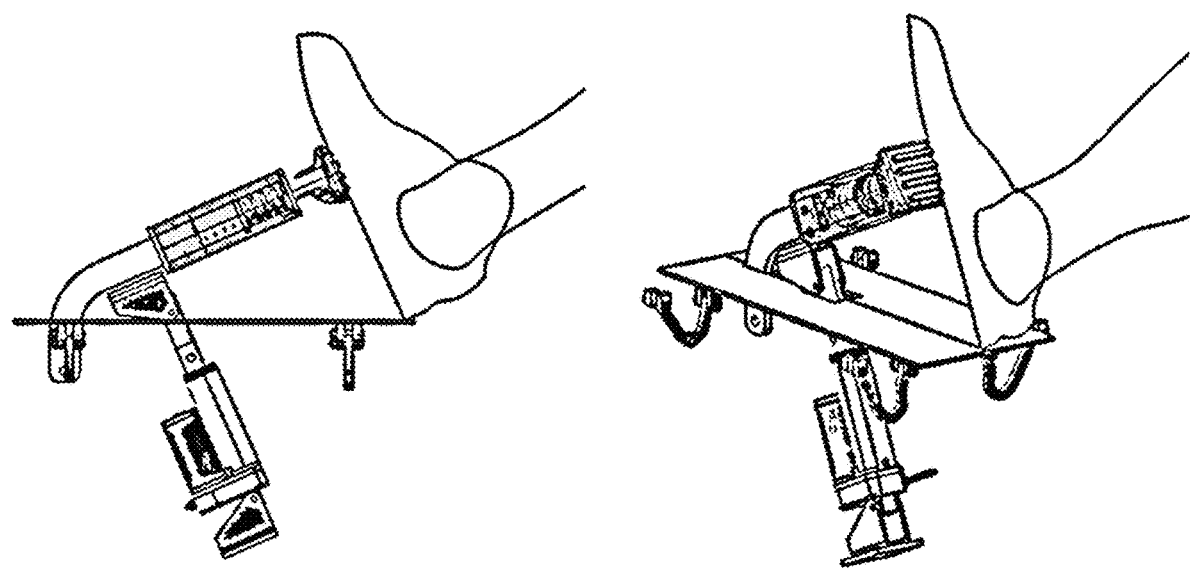
FIG. 2 illustrates a schematic diagram of a brake apparatus according to an embodiment of the present disclosure.

FIG. 2 illustrates a schematic diagram of a braking system according to an embodiment of the present disclosure. Compared with FIG. 1, it can be seen that the brake apparatus shown in FIG. 2 is smaller in size, simpler in structure and more space-saving in mounting. Hereinafter, a brake apparatus and a method for braking a vehicle provided by the present disclosure will be described in detail in conjunction with the accompanying drawings and examples.

Figure 3:
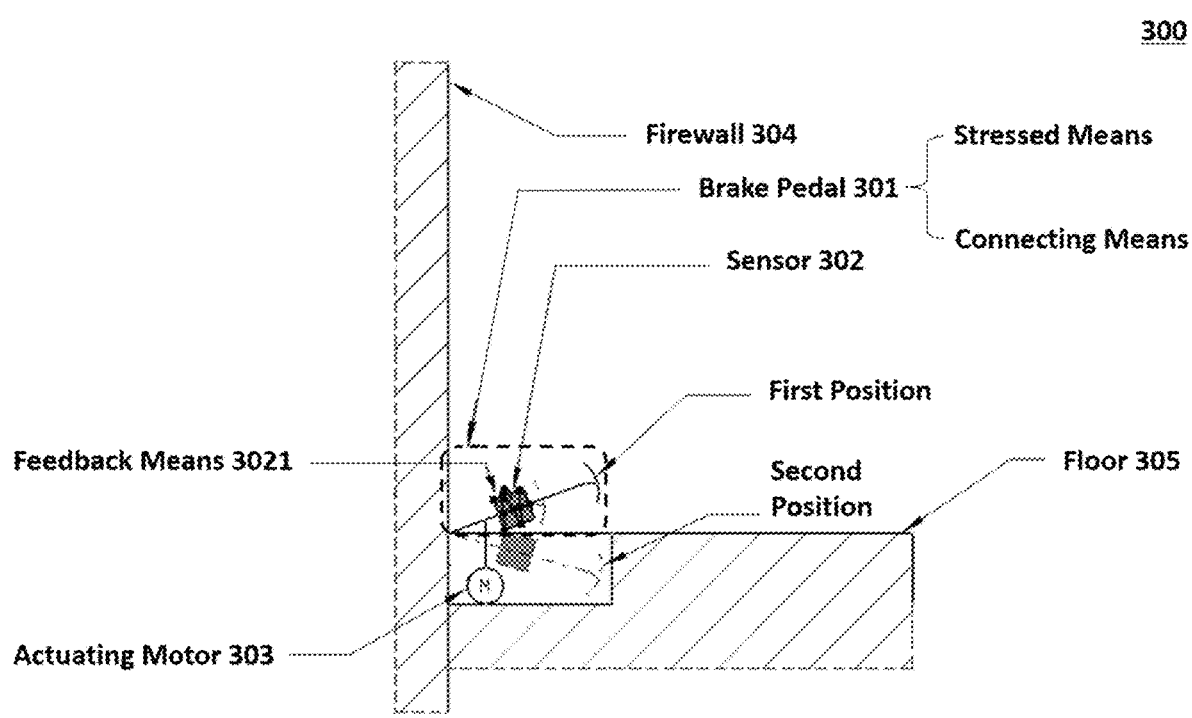
FIG. 3 illustrates a schematic diagram of a brake apparatus according to an embodiment of the present disclosure, wherein the brake apparatus is an example of a vehicle operating apparatus.

First, a schematic diagram of an example of a vehicle operating apparatus according to an embodiment of the present disclosure will be described with reference to FIG. 3. As shown in FIG. 3, taking a brake apparatus 300 as an example of a vehicle operating apparatus, the brake apparatus 300 may at least include a brake pedal 301, a sensor 302 and an actuating motor 303. It should be understood that the shown structure is only exemplary, not restrictive, and the brake apparatus of the present disclosure may include other suitable means in addition to the above-mentioned means, whose illustrations and detailed descriptions will be omitted since they are less related to the content of the current embodiments of the present disclosure or are well known in the art.

Specifically, the brake pedal 301 of the brake apparatus 300 may include a pedal body as a stressed means and a brake push rod as a connecting means connected with the pedal body, wherein the stressed means and the connecting means may be integrally formed or may be independent parts, and the stressed means is configured to receive the force applied thereon by the driver, and the vehicle performs a braking operation in response to the force; the brake push rod is configured such that one end is mechanically connected to the stressed means, and another end is mechanically connected to the vehicle to fix the brake apparatus in a desired position. According to an embodiment of the present disclosure, the brake apparatus 300 may be mounted on a firewall 304 of the vehicle, or preferably, the brake apparatus 300 may be mounted in a non-firewall area of the vehicle, for example, on a floor 305 of the driver's cabin space, or in the central control panel area of the vehicle, or in other areas where the driver can operate. Depending on the mounting position of the brake apparatus 300, the stressed means of the brake pedal 301 may be operated by different body portions of the driver, and the stressed means may take different forms accordingly. For example, in the case that the brake apparatus 300 is located in the driver's foot space, the stressed means may adopt the traditional pedal structure and be operated by the driver's foot stepping; whereas in the case that the brake apparatus 300 is located in the central control panel area of the vehicle or other driver's hand space, the stressed means may take the form of a button or a pull rod or the like which are convenient for hand operation.

The sensor 302 is also mounted on or inside the brake pedal, and is configured to sense information associated with the force applied by the driver and to convert the sensed information into an electrical signal, and the vehicle is able to perform a braking operation in response to the electrical signal. For example, the electrical signal may be received by a processor (processing unit such as CPU, MCU, etc.) and instruct the vehicle to perform a braking action. According to an embodiment of the present disclosure, the information associated with the force applied by the driver is sensed by the sensor 302, and such the information may include the magnitude of the pressure applied by the driver, or the distance and/or angle by which the brake push rod or other related means moves under the force, and depending on the information sensed by the sensor 302, the sensor may be coupled with a corresponding means in the brake apparatus to sense and receive the information related to that means.

Additionally, according to an embodiment of the present disclosure, the sensor 302 may further include a feedback means 3021, which is attached to the brake push rod and generates a reactive force as feedback due to the force applied on the stressed means, wherein the reactive force is generated in a same straight line (but in the opposite direction) with the force applied on the stressed means, and the magnitude of the reactive force increases with the increase of the applied force. For example, the feedback means 3021 may be composed of one or more springs/spring sets, or alternatively, may be another more complicated apparatus (such as an oil hydraulic cylinder, which may provide different feelings for pedal force by matching the hydraulic cylinder with a control device). When the driver applies pressure to the stressed means of the brake pedal 301, the brake push rod is pushed and the spring set attached thereto is compressed, and the compressed spring set generates a reactive force in an opposite direction to the pressure applied by the driver, wherein the magnitude of the reactive force linearly changes with the stroke distance of the brake push rod, thereby providing a force feedback for the driver.

Because the brake apparatus of the present disclosure does not implement the braking operation by means of force transmission, it is unnecessary to adopt a lever mechanism to amplify the torque applied by the driver. Therefore, unlike the traditional suspended lever brake pedal, the brake apparatus according to the present disclosure moves along the direction where the brake push rod is located (as shown by the solid arrow in FIG. 2) due to the force applied by the driver, and its moving direction is in a same line with the direction of the reactive force generated by the feedback means (as shown by the dashed arrow in FIG. 2), so that the feedback means 3021 can provide more linear force feedback for the driver, thereby achieving better maneuverability of the vehicle. On the other hand, because the brake apparatus according to the present disclosure is not required to bear a large amount of torque, and does not have high requirements for the stiffness and strength of the pedal component, so it is more flexible in the material selection of the brake pedal, and it is convenient to realize lightweight design.

In addition, the brake apparatus according to the present disclosure may take a specific form depending on the current state of the vehicle. As shown, the actuating motor 303 is used to actuate the brake pedal 301 to move. Preferably, the actuating motor 303 may be controlled to perform an actuating operation by a processor instructing the vehicle to perform a braking action.

Specifically, the actuating motor 303 may actuate the connecting means of the brake pedal 301 to move according to the current driving state of the vehicle, so that the brake pedal 301 (including the stressed means) is maintained at a desired position. For example, when the vehicle is driving, the brake pedal 301 may be actuated to be in a position where the driver can operate, such as the driver's foot space, whereas when the vehicle is stopped and flamed out, the brake pedal 301 may be actuated to be hidden inside the vehicle. Alternatively, depending on the driver's driving habits or preferences, the vehicle may be set in different driving modes, and the brake pedal 301 may be actuated to expand and retract, or rotate accordingly, so that the brake pedal 301 may be adjusted with different operable lengths and/or angles, thereby providing flexible maneuverability for drivers with different preferences.

Furthermore, according to a preferred embodiment of the present disclosure, in response to a first state of the vehicle, the actuating motor 303 actuates the brake push rod as a connecting means so that the brake pedal 301 is at a first position, whereas in response to a second state of the vehicle different from the first state, the actuating motor 303 actuates the connecting means so that the brake pedal 301 is at a second position. For example, as shown in FIG. 3, at the first position, both the stressed means and brake push rod of the brake pedal 301 or most of the volume of the both are maintained above the floor 305; at the second position, both the stressed means and brake push rod of the brake pedal 301 or most of the volume of the both are accommodated within the space (which may be referred to as an accommodation space) below the surface of the floor 305.

In the present disclosure, the accommodation space is preferably located in the non-firewall area and may accommodate at least most of the volume of the brake pedal 301 so as to improve the utilization rate of the vehicle's space. Additionally, in the present disclosure, a portion of the brake pedal 301 that is accommodated within the accommodation space may be referred to as a body portion of the brake pedal 301, for example, depending on the form of the brake pedal, its main part may refer to the stressed part of the brake pedal 301, or the brake push rod, or both the stressed part and the brake push rod, or at least a part of both the stressed means and the brake push rod of the brake pedal 301.

Preferably, when the vehicle is in a manual driving mode, or in a semi-automatic driving mode, or in a starting state (i.e., a state in which the vehicle has been powered on/ignited), that is, the first state in the above embodiments, the main body portion of the brake pedal 301 may be actuated to be maintained outside the accommodation space; whereas when the vehicle is in an automatic driving mode, or in a flameout or stop state (such as after the key is pulled out or the vehicle is locked), that is, the second state in the above embodiments, the main body portion of the brake pedal 301 may be actuated to be maintained inside the accommodation space, or alternatively, the main body portion of the brake pedal 301 may be actuated to enter or exit the accommodation space according to the interval where the driving speed of the vehicle is in. Additionally, according to an embodiment of the present disclosure, when the position of the brake pedal 301 is switched, the vehicle may prompt the driver visually or audibly, or ask the driver for permission to switch the position of the brake pedal 301, and then switch after obtaining the permission, thereby achieving a more intelligent operation.

In addition, at least for aesthetic and safety reasons, the accommodation space preferably further includes a cover plate for enclosing or at least partially enclosing the accommodation space. For example, when the cover plate is closed, the accommodation space is completely shielded, or partially shielded so that the accommodation space is semi-enclosed. Additionally, the cover plate is configured to be opened before the connecting means is actuated or while the connecting means is moving, so that the main body portion of the brake apparatus is able to pass through the accommodation space, for example, stretching out from the accommodation space, and to remain closed after the connecting means reaches a desired position and stops moving. The cover plate may be actuated by the actuating motor 303 or a separate actuator, or may also be linked with the movement of the brake pedal 301. Additionally, in an embodiment of the present disclosure, the stressed means of the brake pedal 301 may function as the cover plate for the accommodation space. For example, after the brake pedal 301 enters the accommodation space, the stressed means can cover the accommodation space so that the rest portion of the brake pedal 301 is enclosed within the accommodation space, thereby further simplifying and beautifying the brake apparatus.

Additionally, the above embodiments are further described in conjunction with events possibly occurring during the driving of the vehicle. For example, after the vehicle is started, the main body portion of the brake pedal 301 is actuated to stretch out from the accommodation space, and the driver drives the vehicle in the default manual driving mode. In this case, the driver may perform a braking operation on the vehicle by applying a force to the brake pedal 301. Thereafter, when the driver switches the vehicle to the automatic driving mode, the main body portion of the brake pedal 301 is actuated to retreat to the inside of the accommodation space, thereby providing more space for the driver and preventing incorrect manipulation, and the vehicle automatically performs operations such as braking, accelerating and the like. Thereafter, when the driver switches the vehicle from the automatic driving mode back to the manual driving mode or the semi-automatic driving mode again, the main body portion of the brake pedal 301 may stretch out from the accommodation space again. Additionally, in the case that the main body portion of the brake pedal 301 is maintained inside the accommodation space, for safety reasons, when the driving speed of the vehicle exceeds a threshold or meet another specific condition, or in response to a specific instruction actively input by the driver, the main body portion of the brake pedal 301 may also stretch out from the accommodation space for the driver to manually brake or intervene in the automatic driving of the vehicle at any time, or to drive in the semi-automatic driving mode.

Furthermore, as described above, according to the embodiment of the present disclosure, the operating apparatus of the vehicle may also be the accelerating apparatus of the vehicle. In other words, the above various embodiments regarding the brake apparatus 300 described in conjunction with FIG. 3 may each be applied to the accelerating apparatus of the vehicle, that is, the brake pedal 301 shown in FIG. 3 may be replaced as an accelerator pedal for illustration, correspondingly, the accelerator pedal may include a stressed means and an accelerator push rod as a connecting means according to the above various embodiments. Also, the accelerating apparatus further includes a sensor and an actuating motor according to the above various embodiments. Correspondingly, the sensor is configured to sense information associated with a force applied by the driver for accelerating operation and convert the sensed information into an electrical signal, and the vehicle may perform an accelerating operation in response to the electrical signal. Additionally, according to a preferred embodiment of the present disclosure, the brake apparatus and the accelerating apparatus of the vehicle are arranged at different physical positions (e.g., at the position of the driver's left foot and at the position of the driver's right foot, respectively) and are arranged with different forms (e.g., with different angles or heights between both components and the mounting surface), so as to facilitate the driver to operate differently. It can be seen that through at least the above embodiments of the present disclosure, when the vehicle is in a specific driving state, the operating apparatus of the vehicle, such as the brake apparatus or the accelerating apparatus or both, can be accommodated inside a hidden space, thereby improving the utilization rate of the cabin space. On the other hand, by improving the structure of the operating apparatus, the maneuverability of operations, such as accelerating, decelerating or braking, on the vehicle is further improved.

Figure 4:
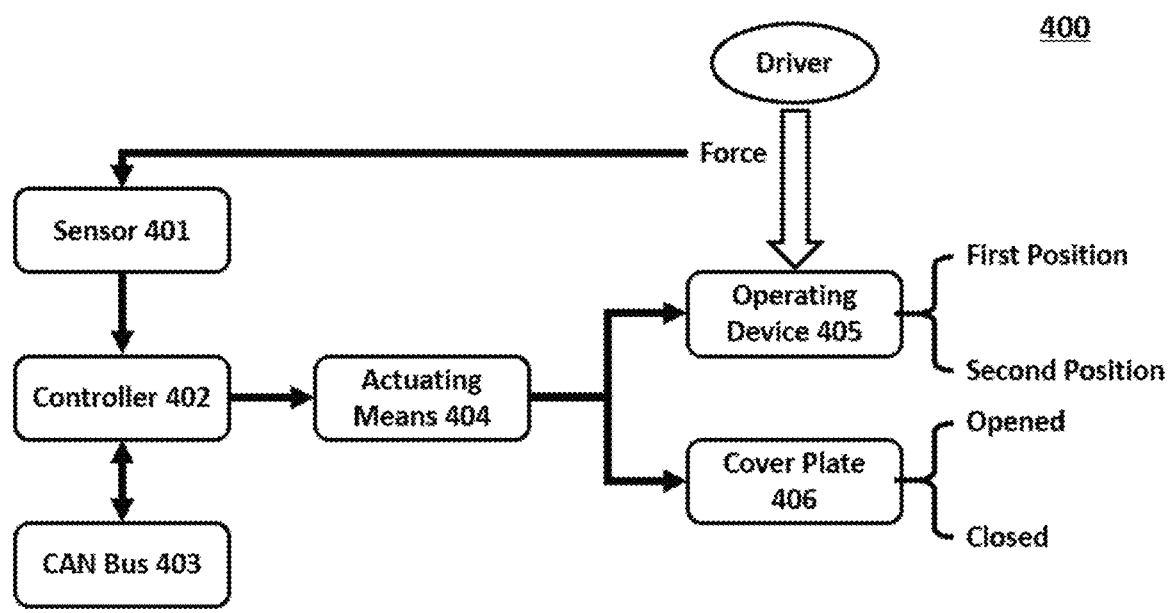
FIG. 4 illustrates a configuration diagram of an example of a braking system according to an embodiment of the present disclosure.

Next, a vehicle operating apparatus according to an embodiment of the present disclosure will be illustrated generally. FIG. 4 illustrates a configuration diagram of an example structure of a vehicle operating apparatus according to an embodiment of the present disclosure. As shown in FIG. 4, a sensor 401 (which may correspond to the sensor 302 in FIG. 3, for example) senses the information associated with the force applied by the driver on the operating apparatus, converts the sensed information into an electrical signal, and sends the electrical signal to a controller 402 (which may correspond to a controller such as a general-purpose processor, a micro-control unit (MCU), a data signal processor (DSP), for example), which in turn sends the electrical signal to a CAN bus 403 so as to instruct the vehicle to perform driving-related operations. Various parts within the vehicle may be connected as communication nodes via the CAN bus, so that various components of the vehicle can communicate in the same way.

On the other hand, the controller 402 further receives signals indicating the current driving state of the vehicle from the CAN bus 403, including, for example, signals indicating the driving mode, start-stop mode or driving speed regarding the vehicle as described above. In response to the current state of the vehicle, the controller 402 sends a corresponding control command to an actuating means 404 to control the motor (which may correspond to the actuating motor 303 in FIG. 3, for example) by controlling the switching elements of the actuating circuit of the actuating means. For example, the actuating circuit may be an H-bridge circuit used to actuate a DC motor. A typical single H-bridge circuit may include a plurality of transistors or electronic components (such as PNP-type triode and NPN-type triode) as switching elements. The processor may control the turning on and turning off of the switching elements, so that the transistors at the same side of the H-bridge can be turned on at different times to control the direction of current flowing through the motor, thus realizing actuating of the revolution of the motor in both forward and reverse directions, and the rotating speed of the electrodes can be controlled by adjusting the magnitude of the current. Such H-bridge driver may be in the form of a circuit, or may be an actuating chip or integrated circuit containing the circuit. The actuating means 404 receives the control command from the controller 402 to actuate the operating apparatus 405 (which may correspond to the brake apparatus 300 in FIG. 3 or the accelerating apparatus, for example) to move to be maintained at a specific position (which may correspond to the first position and the second position in FIG. 3, for example), and may actuate the opening and closing of the cover plate 406 at the same time.

According to the embodiment of the present disclosure, there is further provided a vehicle control system for controlling the vehicle operating apparatus according to the above embodiments. The vehicle control system may include a bus (which may correspond to the CAN bus 403, for example) and a controller module (which may correspond to the controller 402, for example), wherein the control system may determine the current driving state of the vehicle according to vehicle information related to the vehicle, and control the vehicle operating apparatus to be maintained at a specific position according to the determined current driving state of the vehicle. For example, the controller module of the control system controls the actuating means of the vehicle operating apparatus to actuate the connecting means, so that the stressed means is maintained at a specific position, as described above in conjunction with FIG. 3.

Next, an example flowchart of a process for a vehicle control system according to an embodiment of the present disclosure will be described with reference to FIG. 5.

Various steps of the process according to the embodiment of the present disclosure may be executed by means of the corresponding means in the operating apparatus as described above, so in order to avoid repetition, only a brief description of the method will be given below, and detailed description of the same details will be omitted.

Figure 5:
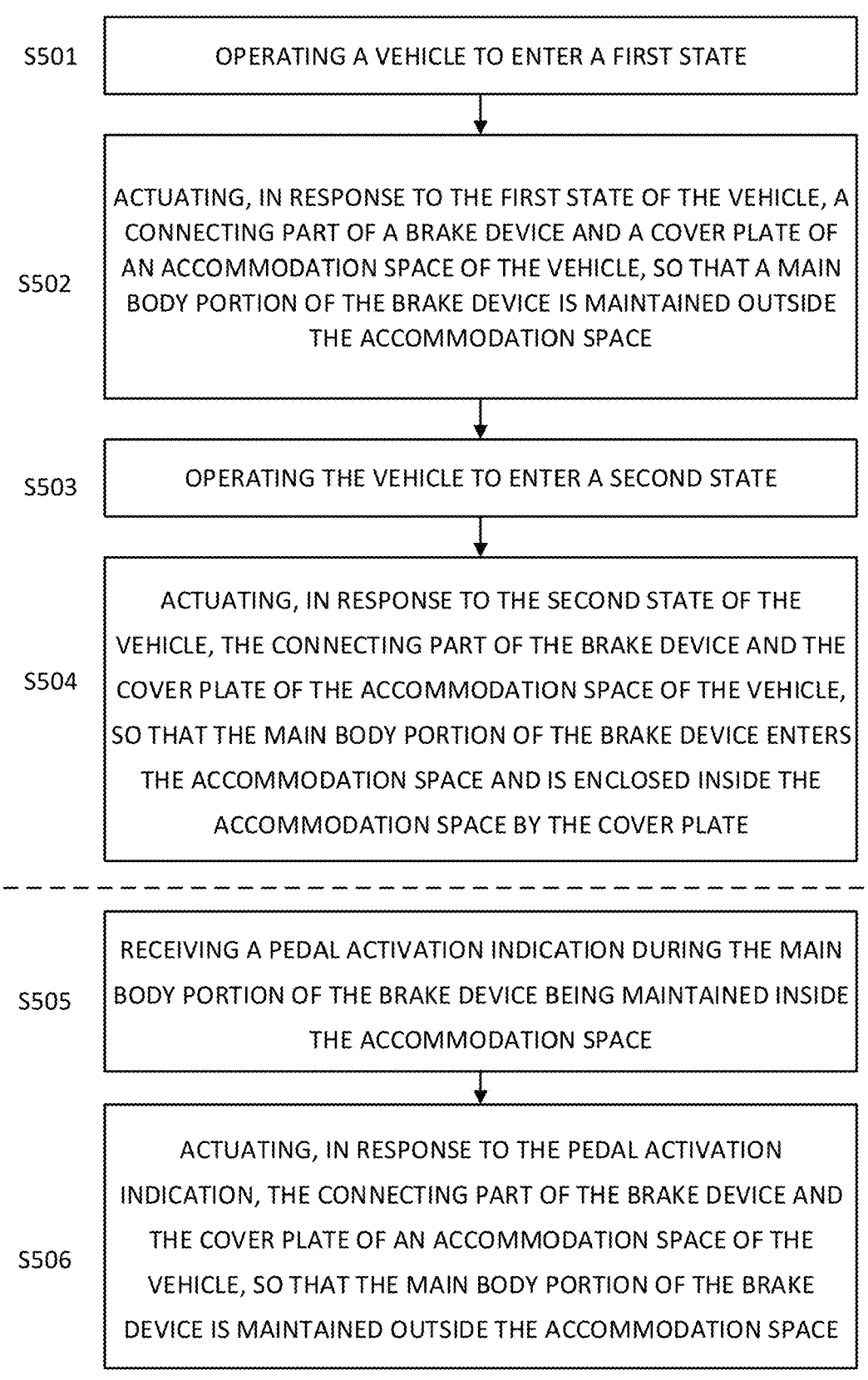
FIG. 5 illustrates an example flowchart of a process for a vehicle control system according to an embodiment of the present disclosure.

FIG. 5 illustrates an example flowchart of a process 500 for a vehicle control system according to an embodiment of the present disclosure.

As shown in FIG. 5, in step S501, the vehicle can enter a first state. For example, the driver operates vehicle to enter the first state during the driving of the vehicle, or the vehicle can enter in the first state automatically without needing the driver's operation. According to the embodiment of the present disclosure, the first state includes the vehicle being in a manual driving mode, the vehicle being in a semi-automatic driving mode, the vehicle being in a starting state, and the driving speed of the vehicle being within a first range.

In step S502, in response to the vehicle being the first state of the vehicle, the connecting means of the operating apparatus and the cover plate of the accommodation space of the vehicle are actuated, so that the main body portion of the operating apparatus is maintained outside the accommodation space. According to the embodiment of the present disclosure, the cover plate of the accommodation space is configured to be opened before or when the connecting means is actuated, so that the main body portion of the operating apparatus passes through the accommodation space. Additionally, according to the embodiment of the present disclosure, the cover plate may be actuated to be closed so as to enclose or partially enclose the accommodation space during the main body portion of the operating apparatus being maintained outside the accommodation space.

In step S503, the vehicle can enter a second state. For example, the driver operates the vehicle to enter the second state during the driving of the vehicle, or the vehicle enters in the second state automatically without needing the driver's operation. According to the embodiment of the present disclosure, the second state includes the vehicle being in an automatic driving mode, the vehicle being in a flameout or stopped state, and the driving speed of the vehicle being in a second range different from the first range.

In step 504, in response to the vehicle being the second state of the vehicle, the connecting means of the operating apparatus and the cover plate of the accommodation space of the vehicle are actuated, so that the main body portion of the operating apparatus enters the accommodation space and is enclosed inside the accommodation space by the cover plate.

Optionally, the operation 500 for the vehicle control system according to the embodiment of the present disclosure may further include the following steps:

In step 505, an activation instruction is received during the main body portion of the operating apparatus being maintained in the accommodation space. According to the embodiment of the present disclosure, the activation indication may be automatically generated based on a specific condition, in which, for example, the driving speed of the vehicle exceeds a threshold, the vehicle is driving on a specific road section, or the like, or based on a specific instruction actively input by the driver.

In step 506, in response to the activation instruction, the connecting means of the operating apparatus and the cover plate of the accommodation space of the vehicle are actuated, so that the main body portion of the operating apparatus is maintained outside the accommodation space. According to the embodiment of the present disclosure, in response to the activation instruction, at least the main body portion of the brake apparatus of the vehicle is maintained outside the accommodation space.

It should be noted that the above operation steps are described for the process of maintaining the operating apparatus at a specific position according to the current state of the vehicle, and are described in the order that the operating apparatus is first maintained outside the accommodation space (steps S501 to S502) and then maintained inside the accommodation space (steps S503 to S504). It should be understood that the order of the above steps may be interchangeable, repetitive, and may be independently executed as a separate process.

Also, it should be understood that before, after or during the execution of the above operation steps, the driver may also apply a force to the operating apparatus to perform driving-related operations, such as accelerating, decelerating or braking, on the vehicle. As described above, the sensor converts the information associated with the force applied by the driver into an electrical signal, so that the vehicle perform a corresponding operation in response to the electrical signal. According to an embodiment of the present disclosure, the operating apparatus (or alternatively, the stressed means of the operating apparatus) moves in a straight line due to the force applied by the driver, and the applied force and the reactive force obtained by the driver are in a same straight line.

Figure 6:
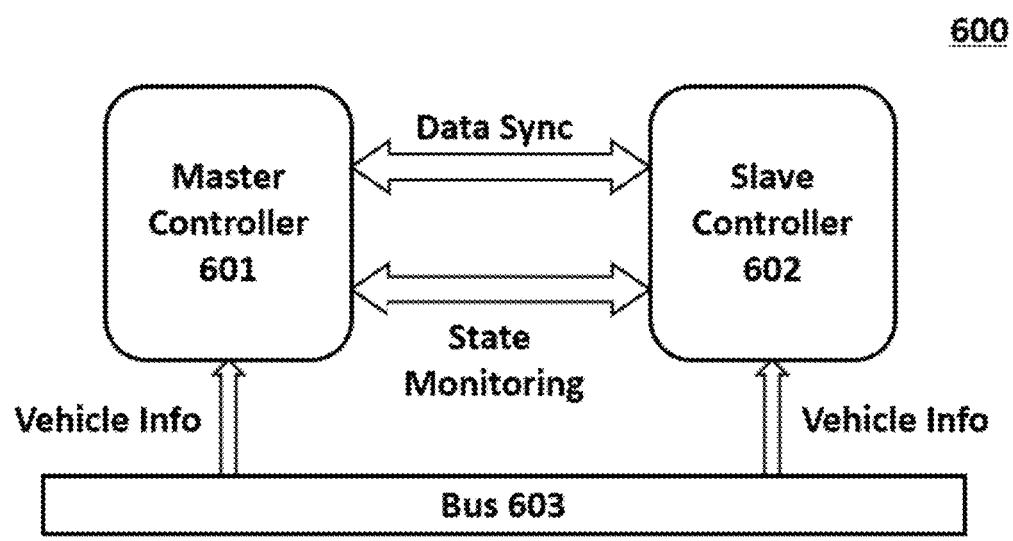
FIG. 6 illustrates a configuration diagram of an example of a controller module according to an embodiment of the present disclosure.

Furthermore, according to an embodiment of the present disclosure, the vehicle control system may further be configured as a control system with a redundant architecture. FIG. 6 illustrates a configuration diagram of an example of a controller module according to an embodiment of the present disclosure.

As shown in FIG. 6, the vehicle control system 600 may include a master controller 601 and a slave controller 602 that are coupled to a bus 603, and the vehicle information may be synchronously received by the master controller and the slave controller, wherein both the master controller 601 and the slave controller 602 receive vehicle information related to driving via the bus 603. More specifically, the main controller 601 in a normal working state is used to determine the driving state of the vehicle based on the received vehicle information, so as to control the operating apparatus of the vehicle according to the driving state of the vehicle, so that the operating apparatus is maintained at a specific position according to the driving state of the vehicle, which may be specifically described in the above embodiments of the present disclosure.

Additionally, the slave controller 602 acts as a backup controller, that is, the slave controller 602 does not process the received vehicle information when the master controller 601 is working normally, but continues to control the operating apparatus of the vehicle in replacement of the master controller 601 only when there is abnormality (e.g. situations in which normal work cannot be achieved, such as power down, controller failure, etc.) in the master controller 601, so as to achieve continuous control. More specifically, the master controller 601 may periodically send first state information indicating its own state and operation information related to controlling the vehicle operating apparatus to the slave controller 602 in every working cycle (such as every 100 ms or 200 ms), so that the slave controller 602 may determine the state of the master controller 601 (whether there is abnormality) according to the first state information and get engaged in work after the abnormality occurs in the master controller 601 (e.g., the next working cycle). The operation information related to controlling the vehicle operating apparatus refers to the information generated by the controller controlling the vehicle operating apparatus, for example, the information indicating the position where the operating apparatus is currently located (being outside or inside the accommodation space) and the opened and closed state of the cover plate. In this way, if there is a sudden abnormality in the master controller 601, it can be quickly switched to the backup controller to continue the control of the vehicle, and after the switching, the original backup controller will be changed to a stand-alone working mode until the master controller returns to be normal. Since the master controller 601 and the slave controller 602 are synchronized in every working cycle so that the whole switching process of the backup controller will not exceed the length of the working cycle, thus ensuring the continuity of the control of the vehicle operating apparatus and improving the driving safety. Additionally, after the master controller returns to be normal, an indication signal indicating that it has returned to work may be generated and sent to the slave controller, or the indication may be made by the master controller periodically resending state information to the slave controller. In response to the indication that the master controller returns to be normal, the slave controller may continue to hand over the control of the vehicle operating apparatus to the master controller for execution.

In addition, according to a preferred embodiment of the present disclosure, the slave controller may also send the second state information indicating its own state to the master controller in every working cycle, so that the master controller and the slave controller may detect each other's state in real time, and when the state of one of the master controller and the slave controller is abnormal, the vehicle control system may issue a warning to the vehicle (or the driver of the vehicle), for example visually or audibly. According to a preferred embodiment of the present disclosure, the warning may include diagnostic information related to the abnormality, by which the reason for the abnormality occurring in the controller can be ascertained. In addition, according to the embodiment of the present disclosure, the state information used to indicate the state of the controller may include a specific field, in which the state of corresponding controller are represented using predefined bits (e.g., 0 represents normality and 1 represents abnormality), or by other methods commonly used in the art. Alternatively, both the controllers may also determine whether the other controller is abnormal by the interval of receiving each other's information. For example, when the slave controller has not received the operation information related to controlling the vehicle operating apparatus sent by the master controller for more than a certain number of working cycles (e.g., 5 working cycles), it can determine that there is abnormality in the master controller, and thus take over the control of the vehicle operating apparatus.

In addition, according to the disclosed embodiments, the number of slave controllers as backup controllers is not limited to one. Alternatively, a plurality of slave controllers may be provided so as to further improve the safety of the vehicle.

Figure 7:
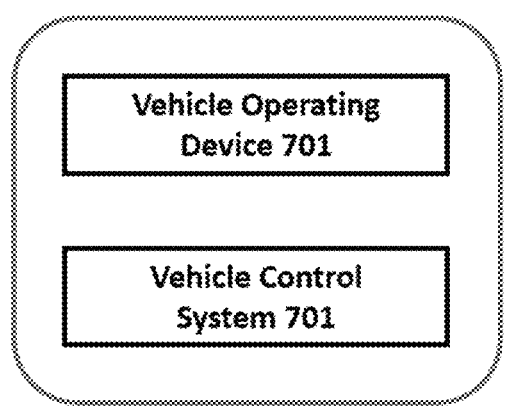
FIG. 7 illustrates a configuration diagram of an example of a vehicle system according to an embodiment of the present disclosure.

FIG. 7 illustrates a configuration diagram of an example of a vehicle system according to an embodiment of the present disclosure. The vehicle system 700 may be a complete vehicle system for vehicle, or a partial system composed of parts, apparatuses or systems only related to specific functions in the vehicle. As shown in FIG. 7, the vehicle system 700 in this example may include a vehicle operating apparatus 701 and a vehicle control system 702. For example, the vehicle operating apparatus 701 may be a vehicle operating apparatus according to the above embodiments of the present disclosure, and the vehicle control system 702 may be or include a controller or a controller module according to the above embodiments of the present disclosure. Optionally, the vehicle operating apparatus 701 in the vehicle system 700 in this example may only refer to a brake apparatus for performing a braking operation on the vehicle, whereas the vehicle control system 702 may only refer to a controller for controlling the brake apparatus. The controller is used to determine the current driving state of the vehicle, to control the main body portion of the brake apparatus to be maintained outside the accommodation space in response to the vehicle being in the first state, and to control the main body portion of the brake apparatus to be maintained inside the accommodation space in response to the vehicle being in the second state, wherein the accommodation space is located below the mounting surface of the vehicle.

FIG. 8 illustrates a configuration diagram of an example of a vehicle operating apparatus according to an embodiment of the present disclosure. Different from a traditional operating apparatus having a connecting push rod, as shown in FIG. 8, the vehicle operating apparatus according to the embodiment of the present disclosure is provided with one or more pedal components with corresponding functionalities, and these pedal components can be directly mounted on a panel (that is, pedal panel) without coupling via a connecting push rod or similar.

Figure 8A:
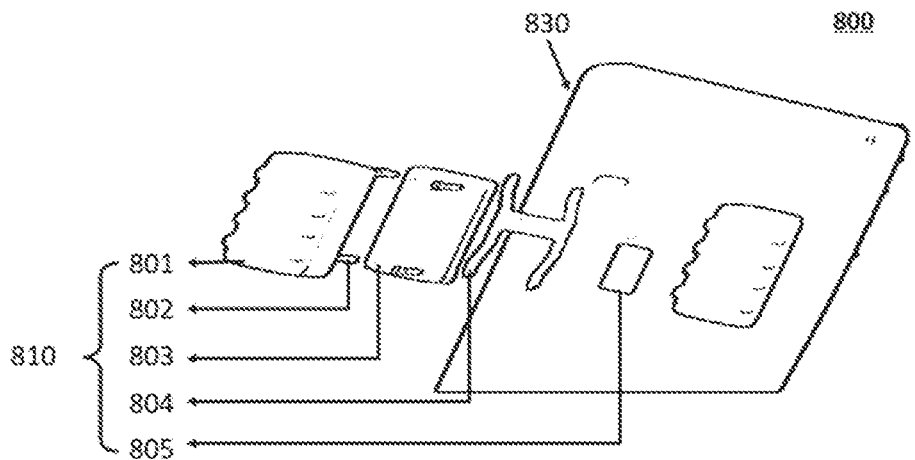
FIGS. 8A and 8B illustrate a configuration diagram of an example of a vehicle operating apparatus according to an embodiment of the present disclosure.

Specifically, as shown in FIG. 8(a), the vehicle operating apparatus 800 includes a pedal panel 830 in which two pedal members (810, 820) serving as a brake pedal and an accelerator pedal, respectively, are embedded. Taking the brake pedal 810 as an example, the brake pedal 810 can include a pedal pad 801, which forms a protrusion on the surface of the pedal panel and receives the force thereon applied by the driver. For example, the pedal pad 801 can be a rubber pad or other elastic pad, and has a texture on its surface to increase the friction force; an elastic element 804 arranged below the pedal pad 801 and configured to be deformed under the force applied by the driver; and a force sensor 805 configured to generate an electrical signal according to an amount of deformation of the elastic element 804, so that the vehicle is able to perform a corresponding driving operation in response to the generated electrical signal.

According to another embodiment of the present disclosure, the brake pedal 810 may further include a pedal backboard 803, which can be a plate positioned between the pedal pad 801 and the elastic element 804 (for example, by four screws 802 located at the corners) so as to move and provide pressure to the elastic element under the force applied by the driver. The pedal backboard 803 is preferably made of a rigid material. In this way, the pedal backboard 803 can uniformly pass the force applied by the driver to the elastic element 804.

In addition, in order to further optimize the space of the vehicle operating apparatus 800, components such as the pedal back plate 803 and the elastic element 804 can be hidden under the surface of the pedal panel 830. For example, the screw(s) 802, the pedal back plate 803, the elastic element 804 and the force sensor 805 are covered by the pedal pad 801 and accommodated in the space under the surface of the pedal panel 830.

Figure 8B:
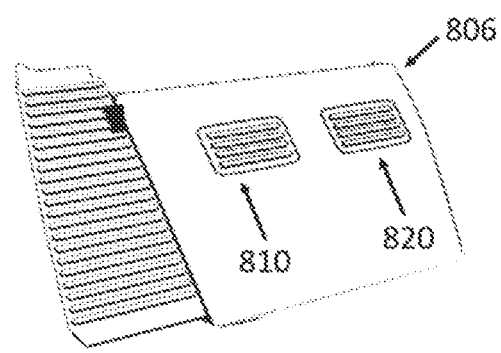

The pedal 820 of the accelerating apparatus may have the same or similar structure. In addition, as shown in FIG. 8(b), the pedal 810 of the brake apparatus and the pedal 820 of the accelerating apparatus of the vehicle can be arranged on the same panel 830, thus forming a vehicle operating apparatus integrating braking and acceleration functions as a whole. With this configuration, the brake pedal and the accelerator pedal can be formed on same pedal panel with small protrusions, and according to the current driving state of the vehicle, the pedal panel including the brake pedal and the accelerator pedal can be actuated as a whole to move in translation, pivot, or a combination of the two, thereby providing more activity space for the driver.

On the other hand, due to the use of the elastic element, the driver's operating stroke (i.e., movement distance of the action for operating) for the pedal component is limited within the deformation range of the elastic element, so the driver can achieve a large force with a short operating stroke, in other words, even if the driver exerts a large force on the pedal pad, there is no need to perform an action with a long stroke, thus avoiding the driver's fatigue caused by operations. In addition, depending on the specific function of the pedal component, the elastic element may have different elastic coefficients to provide a suitable force feedback. For example, the elastic elements in the brake pedal can have a relatively large elastic coefficient, resulting in a larger feedback force, so that the driver can better perceive the degree of braking, while the elastic elements in the accelerator pedal can have a relatively small elastic coefficient, so that the driver can control the vehicle in a flexible manner. By the above implementations, the elastic element is configured so that there is a good linear relationship between the force and the operation stroke. Also, the size of the vehicle operating apparatus is reduced, and the driver's driving experience is further improved.

The vehicle operating apparatus, the vehicle system and various operations for the vehicle according to the embodiments of the present disclosure have been described above with reference to the accompanying drawings. Through various aspects and embodiments of the present disclosure, the driver's cabin space can be expanded while ensuring safety, and the driver's maneuverability of the vehicle can be further improved.

In addition, the basic principles of the present disclosure have been described above in combination with specific embodiments, but it should be pointed out that the advantages, benefits, effects and the like mentioned in the embodiments of the present disclosure are only examples rather than limitations, and these advantages, benefits, effects and the like cannot be considered as necessary for various embodiments of the present disclosure. Additionally, the specific details disclosed above are only for the purpose of illustration and easy understanding, but not for limitation, and the above details do not limit that the present disclosure must be implemented with the above specific details.

The block diagrams of devices, equipment, apparatuses and systems involved in the embodiments of the present disclosure are only illustrative examples and are not intended to require or imply that they must be connected, arranged and configured in the manner as shown in the block diagram. As those skilled in the art will recognize, these devices, equipment, apparatuses and systems can be connected, arranged and configured in arbitrary way. Words such as "including", "containing", "having" and so on are open words, which mean "including but not limited to" and can be used interchangeably therewith. Terms such as "or" and "and" as used herein refer to the phrase "and/or", and can be used interchangeably therewith, unless clearly indicated otherwise in the context. The word "such as" as used herein refers to the phrase "such as but not limited to", and can be used interchangeably therewith.

Additionally, as used herein, the "or" used in the enumeration of items starting with "at least one of" indicates a separate enumeration, so that, for example, the enumeration of "at least one of A, B or C" means A or B or C, or AB or AC or BC, or ABC (i.e. A and B and C). Furthermore, the wording "exemplary" does not mean that the described example is preferred or better than other examples.

It should also be pointed out that in the apparatus and method of the present disclosure, various components or steps can be decomposed and/or recombined. These decomposition and/or recombination should be regarded as equivalent solutions of the present disclosure.

For ordinary skilled in the art, it can be understood that all or any part of the method and apparatus disclosed in the present disclosure can be implemented in hardware, firmware, software or their combination in any computing device (including processor, storage medium, etc.) or network of computing devices. The hardware may be a general-purpose processor, a digital signal processor (DSP), an ASIC, a field programmable gate array signal (FPGA) or other programmable logic device (PLD), discrete gate or transistor logic, discrete hardware components, or any combination thereof designed for performing the functions described herein. A general-purpose processor may be a microprocessor, but alternatively, the processor may be any commercially available processor, controller, microcontroller or state machine. A processor may also be implemented as a combination of computing devices, such as a combination of a DSP and a microprocessor, a plurality of microprocessors, one or more microprocessors cooperating with a DSP core, or any other such configuration. The software may exist in any form of computer-readable tangible storage media. By way of example and not limitation, such computer-readable tangible storage media may include RAM, ROM, EEPROM, CD-ROM or other optical disk storage, magnetic disk storage or other magnetic storage devices or any other tangible media that can be used to carry or store desired program codes in the form of instructions or data structures and that can be accessed by a computer. As used herein, a disc includes compact disc (CD), laser disc, optical disc, digital versatile disc (DVD), floppy disc and Blu-ray disc.

Various changes, substitutions and modifications may be made to the techniques described herein without departing from the taught techniques defined by the appended claims. In addition, the scope of the claims of the present disclosure is not limited to the specific aspects of the above-mentioned processes, machines, manufactures, composition of events, means, methods and actions. Currently existing or later-to-be-developed processes, machines, manufactures, composition of events, means, methods or actions that perform substantially the same functions or achieve substantially the same results as the corresponding aspects described herein may be utilized. Accordingly, the appended claims include, within their scope, such processes, machines, manufactures, composition of events, means, methods or actions.

The above description of the disclosed aspects is provided to enable any skilled in the art to make or use the present disclosure. Various modifications to these aspects will be obvious to those skilled in the art, and the general principles defined herein can be applied to other aspects without departing from the scope of the present disclosure. Therefore, the present disclosure is not intended to be limited to the aspects shown herein, but is to be accorded the widest scope consistent with the principles and novel features disclosed herein.

The foregoing description has been presented for purposes of illustration and description. Furthermore, this description is not intended to limit the embodiments of the present disclosure to the forms disclosed herein. Although several example aspects and embodiments have been discussed above, those skilled in the art will recognize certain variations, modifications, changes, additions and sub-combinations thereof.

What is claimed is:

1. A vehicle operating apparatus comprising:
    a stressed means configured to receive a force applied thereon by a driver;
    a connecting means configured such that a first end is mechanically connected to the stressed member and a second end is mechanically connected to a mounting surface of the vehicle;
    a sensor configured to sense information associated with the force applied by the driver and convert the information into an electrical signal, and the vehicle is able to perform a corresponding driving operation in response to the electrical signal; and
    an actuating means configured to actuate the connecting means according to a current driving state of the vehicle so that the stressed means is maintained at a specific position, comprising:
    actuating the connecting means in response to the vehicle being in a first state, so that a main body portion of the vehicle operating apparatus is maintained outside an accommodation space; and
    actuating the connecting means in response to the vehicle being in a second state, so that the main body portion of the vehicle operating apparatus is maintained inside the accommodation space;
    wherein the accommodation space is located below the mounting surface.

2. The vehicle operating apparatus according to claim 1, wherein
    the first state includes the vehicle being in a manual driving mode, the vehicle being in a semi-automatic driving mode, the vehicle being in a starting state, and the driving speed of the vehicle being within a first range; and
    the second state includes the vehicle being in an automatic driving mode, the vehicle being in a flameout or stop state, and the driving speed of the vehicle being within a second range different from the first range.

3. The vehicle operating apparatus according to claim 1, wherein the accommodation space further includes:
    a cover plate configured to be opened before or when the connecting means is actuated, so that the main body portion of the vehicle operating apparatus passes through the accommodation space, and to remain closed at other times.

4. The vehicle operating apparatus according to claim 1, wherein
    during the main body portion of the vehicle operating apparatus being maintained in the accommodation space, the connecting means is actuated in response to an activation indication input by the driver, so that the main body portion of the vehicle operating apparatus moves to be outside the accommodation space.

5. The vehicle operating apparatus according to claim 1, wherein the second end of the connecting means is mounted in a non-firewall area of the vehicle.

6. The vehicle operating apparatus according to claim 1, wherein the connecting means further includes:
    a feedback means configured to generate a reactive force due to the force applied by the driver on the stressed means, and a direction of the reactive force is in a same line with a direction in which the stressed means moves under the force applied by the driver.

7. The vehicle operating apparatus according to claim 1, wherein
    the vehicle operating apparatus is a brake apparatus or an accelerating apparatus,
    the brake apparatus performs a braking operation on the vehicle in response to the electrical signal; and
    the accelerating apparatus performs an accelerating operation on the vehicle in response to the electrical signal.

8. The vehicle operating apparatus according to claim 1, wherein
    the connecting means is actuated to perform a movement, and the movement includes translational movement, pivotal movement, or a combination thereof.

9. A vehicle system comprising:
    a vehicle operating apparatus comprising:
        a stressed means configured to receive a force applied thereon by a driver;

a connecting means configured such that a first end is mechanically connected to the stressed member and a second end is mechanically connected to a mounting surface of the vehicle;

a sensor configured to sense information associated with the force applied by the driver and convert the information into an electrical signal, and the vehicle is able to perform a corresponding driving operation in response to the electrical signal; and an actuating means configured to actuate the connecting means according to a current driving state of the vehicle so that the stressed means is maintained at a specific position; and a vehicle control system configured to control the vehicle operating apparatus according to the current driving state of the vehicle, wherein the vehicle control system comprises:

a bus via which vehicle information related to vehicle driving is transmitted; and a controller module coupled with the bus and configured to determine the current driving state of the vehicle according to the vehicle information, and control the actuating means of the vehicle operating apparatus to actuate the connecting means according to the current driving state of the vehicle, so that the stressed means is maintained at a specific position.

10. The vehicle system according to claim 9, wherein the controller module includes a master controller and a slave controller, wherein the master controller and the slave controller are configured to receive the vehicle information synchronously via the bus;

the master controller is further configured to determine the current driving state of the vehicle based on the vehicle information, control the vehicle operating apparatus according to the current driving state of the vehicle, and periodically send first state information indicating its own state and operation information related to controlling the vehicle operating apparatus to the slave controller; and the slave controller is further configured to determine a state of the master controller according to the first state information, take over control, when the state of the master controller is determined to be abnormality, of the vehicle operating apparatus of the vehicle based on the received operation information in the next working cycle, and provide a warning to the vehicle, wherein the warning further includes diagnostic information related to the abnormality.

11. The vehicle system according to claim 10, wherein the slave controller is further configured to periodically send second state information indicating its own state to the master controller; and the master controller is further configured to determine a state of the slave controller according to the second state information, and provide a warning to the vehicle when the state of the slave controller is determined to be abnormality, wherein the warning further includes diagnostic information related to the abnormality.

12. A vehicle braking system comprising:
a brake apparatus for braking a vehicle;

a controller for determining a current driving state of the vehicle, and controlling a main body portion of the brake apparatus to be maintained outside an accommodation space in response to the vehicle being in a first state, and controlling the main body portion of the brake apparatus to be maintained inside an accommodation space in response to the vehicle being in a second state, wherein the accommodation space is located below a mounting surface of the vehicle;

wherein the brake apparatus comprises:

a stressed means configured to receive a force applied thereon by a driver; and a connecting means configured such that a first end is mechanically connected to the stressed member and a second end is mechanically connected to a mounting surface of the vehicle, and the connecting means comprises:

a feedback means configured to generate a reactive force due to the force applied by the driver on the stressed means, and the feedback means is arranged along a direction in which the connecting means extends, such that a direction of the generated reactive force is in a same line with a direction in which the stressed means moves under the force applied by the driver.

13. A vehicle operating apparatus comprising:

a pedal panel in which one or more pedal components are embedded, wherein the one or more pedal components include at least one of a brake pedal and an accelerator pedal, and each of the pedal components comprises:

a pedal pad configured to protrude on a surface of the pedal panel and receive a force applied thereon by a driver;

an elastic element arranged below the pedal pad and configured to be deformed under the force applied by the driver; and a force sensor configured to generate an electrical signal according to an amount of deformation of the elastic element, and the vehicle is able to perform a corresponding driving operation in response to the electrical signal;

wherein a first elastic element in the brake pedal has a first elastic coefficient, and a second elastic element in the accelerator pedal has a second elastic coefficient, and the first elastic coefficient is greater than the second elastic coefficient.

14. The vehicle operating apparatus according to claim 13, wherein the pedal member further comprises:

a pedal backboard arranged between the pedal pad and the elastic element and configured to move and provide pressure to the elastic element under the force applied by the driver.

15. The vehicle operating apparatus according to claim 14, wherein the pedal backboard and the elastic element are hidden beneath the surface of the pedal panel.

16. The vehicle operating apparatus according to claim 13, wherein the pedal panel is actuated to perform a movement according to a current driving state of the vehicle, and the movement includes translational movement, pivotal movement, or a combination thereof.

* * * * *